United States Patent [19]
Burkett et al.

[11] Patent Number: 5,352,865
[45] Date of Patent: Oct. 4, 1994

[54] PROGRAMMABLE LOAD COMPENSATION METHOD AND APPARATUS FOR USE IN A FOOD OVEN

[75] Inventors: Douglas A. Burkett; Gary L. Mercer, both of Eaton, Ohio

[73] Assignee: Henny Penny Corporation, Eaton, Ohio

[21] Appl. No.: 972,771

[22] Filed: Nov. 9, 1992

Related U.S. Application Data

[63] Continuation-in-part of Ser. No. 746,910, Aug. 19, 1991, Pat. No. 5,317,130.

[51] Int. Cl.$^5$ .............................................. H05B 1/02
[52] U.S. Cl. ..................... 219/486; 219/492; 219/497; 219/508; 219/413; 99/328; 99/331
[58] Field of Search ............... 219/492, 497, 508, 499, 219/501, 483–486, 412, 413; 99/325, 331, 329, 328

[56] References Cited

U.S. PATENT DOCUMENTS

| | | | |
|---|---|---|---|
| 4,238,669 | 12/1980 | Huntley | 219/405 |
| 4,379,964 | 4/1983 | Kanazawa et al. | 99/331 |
| 4,913,038 | 4/1990 | Burkett et al. | 219/492 |
| 4,924,073 | 5/1990 | Chiba | 219/413 |
| 4,962,299 | 10/1990 | Duborper et al. | 219/492 |
| 4,968,515 | 11/1990 | Burkett et al. | 99/327 |
| 5,044,262 | 9/1991 | Burkett et al. | 99/329 |

Primary Examiner—Mark H. Paschall
Attorney, Agent, or Firm—Baker & Botts

[57] ABSTRACT

A method and apparatus is disclosed which automatically adjusts the on-time of preferably quartz lamp heating elements in an oven having both quartz lamp and electric heating elements. In such an oven having dual heating elements, the temperature of the oven's cavity increases when numerous food items (loads) are rapidly cooked in succession. The present invention allows a dual heating element oven to automatically compensate for these increases in temperature by preferably shortening a predetermined on-time of the quartz bulbs. The on-time is continuously compensated using a microcomputer, dependent upon the current oven temperature. The microcomputer preferably uses at least two clocks to shorten the predetermined on-time of the quartz bulbs.

5 Claims, 7 Drawing Sheets

PROGRAMMABLE LOAD COMPENSATION METHOD AND APPARATUS FOR USE IN A FOOD OVEN

CROSS-REFERENCES TO RELATED APPLICATIONS

This application is a continuation-in-part of U.S. application Ser. No. 07/746,910 filed Aug. 19, 1991 entitled "PROGRAMMABLE LOAD COMPENSATION METHOD AND APPARATUS FOR USE IN A FOOD OVEN", now U.S. Pat. No. 5,317,130, which is related by subject matter to commonly owned applications entitled "PREHEATING METHOD AND APPARATUS FOR USE IN A FOOD OVEN", Ser. No. 07/746,760 filed Aug. 19, 1991, now U.S. Pat. No. 5,296,683 and to "METHOD AND APPARATUS FOR OPERATING A FOOD OVEN", Ser. No. 07/748,200 filed Aug. 19, 1991, now U.S. Pat. No. 5,182,439.

REFERENCE TO MICROFICHE APPENDIX

Source code for the process performed by the present invention in a preferred embodiment is contained in the parent application Ser. No. 07/746,910, now U.S. Pat. No. 5,182,439, in 224 frames on 4 microfiche, in the microfiche appendix.

BACKGROUND OF THE INVENTION

1. Field of the Invention

This invention relates generally to the field of food ovens. More specifically, the present invention is directed to a food oven having at least one heating element whereby control means are provided for controlling heating element and includes a load compensation feature to efficiently cook a particular food item.

2. Description of the Relevant Art and Problem

Today, restaurants find it increasingly more desirable to efficiently cook food in order to provide fast service and to reduce the labor costs involved in the cooking process. Efficiency means that a particular food item is cooked in a short time and with minimal interaction required from an operator while not sacrificing food quality.

Many ovens currently in use contain a single heating element and the user must set the temperature and monitor the food item to determine when to remove it from the oven. Some ovens contain a timer which turns the heating element on and off to allow a food item to cook for a predetermined time.

U.S. Pat. No. 4,238,669 to Huntley, is directed to and entitled, an oven Having Dual Heating Means. This invention describes an oven having a base plate which is heated. Food items may be placed directly on the heated base plate. A second heating element, preferably a quartz lamp heating element, is placed above the base plate, in the oven's cavity. This quartz heater has a greater thermal intensity than the base heater. A timer is provided which allows the quartz heater to be turned on after a predetermined time, and remain on for a second predetermined time. This would allow, for example, the top of a pizza to be browned quickly after the pizza had almost fully cooked. Thus, the brief time but intense heat from the quartz heater permits a pizza to be rapidly cooked and the top browned without sacrificing food quality.

However, an operator must select a proper time for when the quartz heater should be operated, and also determine how long the quartz heater should be operated. These two time periods differ depending upon the current temperature of the oven and the type of food being cooked. Only an operator skilled with this type of oven having dual heating elements can accurately determine the most efficient time and method for cooking a particular food item. Consequently, there is a need to provide an automatic means for operating such a dual heating element oven which considers both the current temperature of the oven and the type of food being cooked.

Restating the problem, unless the food item is constantly monitored by the operator, it may become overcooked because of previous cooking cycles heating the oven which increases the latent heat stored in the air and oven structure. For example, an oven which uses quartz lamp bulbs as well as conducted and convected heat will overcook pizzas if pizzas are rapidly cooked in sequence.

SUMMARY OF THE INVENTION

These and other problems of the prior art are solved by the present invention. The present invention is capable of automatically preheating an oven having dual heating means. Additionally, the present invention provides a means of programming the oven to vary the on time of the quartz heating element depending upon the type of food item to be cooked. Furthermore, the present invention allows the oven to automatically adjust these quartz lamp on times depending upon the current temperature of the oven.

More specifically, the present invention preferably allows up to three cooking intervals to be programmed: brown, cooked and finish intervals. One cooking cycle may consist of each of these three intervals, each interval being set for a period of 0 to 15 minutes. However, while staying within the scope of the present invention, each interval could just as easily be longer than 15 minutes in length. The quartz lamps within the oven may be programmed to be switched either on or off during each interval. For example, the quartz lamp could be on briefly during the brown interval, off during the lengthier cook interval and on again briefly during the finish interval.

To ensure uniform consistency of a cooked food item, the present invention provides a method for programmable load compensation. This method consists of automatically compensating for variations in the temperature of the food product placed in the oven, as well as the amount of stored heat accumulated within the oven from previous use. That is, the effect of the food product temperature on the air temperature is measured by directly measuring the air temperature. Compensation is performed by varying the amount of time during which the quartz lamps are turned on during a specific interval as a function of preferably three factors: the actual air temperature within the oven cavity, the base temperature set point, and a programmable load compensation factor. First, regarding air temperature, when the air temperature increases, the actual on-time of the quartz lamp decreases. Thus, above a certain air temperature, no additional compensation takes place. Conversely, below a certain air temperature no load compensation takes place.

Second, the base temperature set point is a temperature value preferably predetermined and stored into non-volatile memory of the present invention. Like setting a thermostat, this value tells the oven at which temperature it should maintain itself. The set point may be set depending upon the particular food item to be cooked.

Third, load compensation factors are programmed into non-volatile memory of the present invention. These factors are used in conjunction with a difference between the actual temperature and the set point temperature to control the length of cooking time for different food items.

Additionally, the present invention allows for a method of automatically preheating the oven based upon its immediate usage history. This preheat function operates by regulating the base heating elements until they are within a specified temperature range from the program base set point temperature, and then turns the quartz lamps on until the air temperature within the oven cavity reaches a certain fixed preheat "exit" temperature. This preheat exit temperature need not be a fixed value, but can be a function of the base set point temperature or the air temperature before or during the preheat operation. In addition, the preheat function can be performed at various times during the oven's operation, and not necessarily upon power up of the oven.

The above descriptions of the present invention provide only a broad overview of preferred embodiments within the present invention. The details of certain aspects of the present invention will be more fully understood from the following specification and drawings.

DETAILED DESCRIPTION

The present invention preferably embodies a hardware controller which performs various functions on the oven. The hardware for the controller will first be described, with the functions and steps performed by the hardware described thereafter.

Hardware Description

Figure 1:
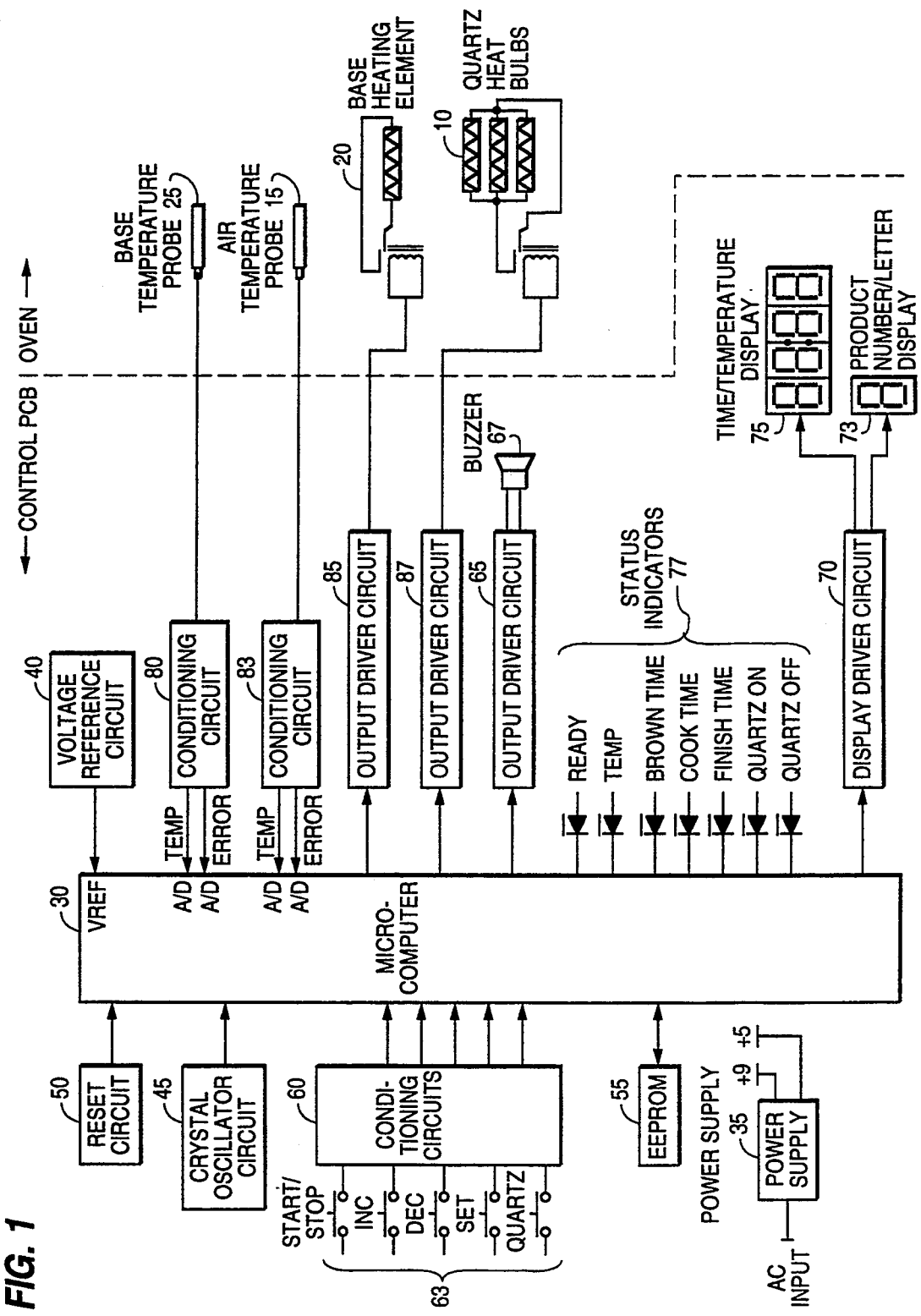
FIG. 1 shows a block diagram of the control hardware for the oven in the present invention.

Referring to FIG. 1, two heating elements 10 and 20 are disposed within an oven having a base and a cavity (not shown). Base heating element 20 is located preferably underneath a base plate, preferably the HTX TRANSITE II ™ base by BNZ MATERIALS, INC. However, other base materials such as metal, compressed asbestos, ceramics or other materials on which food may directly be placed and which are able to withstand great temperatures may be used. Base heating element 20 could be a gas heater or other heating means, but preferably is a 3200 watt CALROD electric heating element.

Located within the oven's cavity and above the base plate, preferably near the roof of the cavity, is located the second heating means 10, preferably quartz heat bulbs. The quartz heat bulbs must be able to provide a higher thermal intensity for a substantially brief heating period as opposed to the base heating element 20. Base heating element 20 preferably provides conducting heat whereas the quartz heat bulbs 10 preferably provide radiant heat. Both heating means also have appropriate relays or other circuitry to properly switch or toggle them from a first state (on) or a second state (off).

Two temperature probes are provided within the oven to detect temperature within the cavity and base of the oven. Base temperature probe 25 is thus located within or proximate to the base while air temperature probe 15 is located within an air duct immediately outside the oven cavity. Base temperature probe 25 should be placed so as to receive approximately the mean temperature of the base. Similarly, air temperature probe 15 should be placed within the oven cavity, so that it may detect the mean temperature of the air within the oven cavity. Consequently, probes 15 and 25 should not be placed too far, nor too close to heating elements 10 and 20.

Microcomputer 30, which preferably is a Motorola MC68705R3L, provides the computing resources for the hardware, and specifically for the control board. This microcomputer includes a microprocessor and also includes a 4-channel, 8-bit A/D converter which is used to convert the temperature voltage signals from temperature probes 15 and 25 to digital values for computing and control. Microcomputer 30's internal non-volatile memory (ROM or PROM, or preferably EPROM) stores the program code described in detail below. Microcomputer 30 also contains internal random access (RAM) which is used for calculation purposes.

Power supply 35, located mainly on the control board in a preferred embodiment, also includes an off-board transformer which converts an AC power input into a proper power supply for the control board and microcomputer 30. Capacitors are provided in power supply 35 to provide EMI/RFI filtering. Additionally, fuses and metal oxide varistors (MOV) are included to provide surge protection. Power supply 35 also preferably includes a diode bridge to fully rectify an AC input voltage into a DC voltage. Additionally, an integrated circuit voltage regulator, as is commonly available in the market, is provided. All of the above elements and construction for power supply 35 are well known in the art.

Reset circuit 50 coupled to microcomputer 30 preferably comprises a capacitor. Crystal oscillator circuit 45 forms the system clock oscillator comprised of preferably a capacitor and a crystal oscillator oscillating at 4 megahertz. This results in an internal clock rate of *1 megahertz. Voltage reference circuit 40 establishes the reference voltages for the internal A/D converter.

EEPROM 55 is a non-volatile memory, preferably located on an integrated circuit capable of serial communications, for example, TS93C46. EEPROM 55 stores the product parameters: times, temperatures, quartz heating settings, and load compensation factors, all of which will be described in more detail below. Appropriate protection circuitry is preferably also connected with EEPROM 55 to insure that the contents of the non-volatile memory are not inadvertently changed during control power-up and power-down.

Microcomputer 30 also contains appropriate inputs 63 for user input located on the exterior of the oven and outputs for display devices described below. Protection circuitry to insure that noise does not generate false interrupts or corrupt control signal operation is included as well known to those in the art.

Conditioning circuit 60 provides preferably pull-down resistors which insure that switch input voltages from user input switches 63 do not float when no switch is pressed. Thus, circuit 60 results in preferably an output voltage of approximately 5 volts when a switch is pressed and approximately 0 volts when no switch is pressed.

LED status indicator 77 is provided to indicate the following states: ready, temperature, brown time, cook time, finish time, quartz lamp on, quartz lamp off. These states will be describe in more detail below. Signals from microcomputer 30 are coupled to status indicators 77, preferably, LEDS, but could be other indication means.

Display driver circuit 70 is preferably an integrated circuit such as MC14489. The display driver circuit 70 preferably is a multiplexing driver circuit to drive time/temperature display 75 and product number/letter display 73. Displays 73 and 75 are preferably seven segment LED displays, but could be other indicating means as are well known in the art. Displays 73 and 75 and indicator 77 are preferably physically located on the control panel on the front panel of the oven. Seven segment display 75 can display both time, numbers and limited alphanumeric messages of up to four characters. Display 73 is used to display the current selected product number from 1 to 9 or a letter from A through F.

Buzzer 67 is preferably a piezoelectric buzzer having a main feedback and ground connection. The buzzer is used to provide audible feedback to the operator of various control operation conditions. Output driver circuit 65 preferably is a modified Hartly oscillator which drives buzzer 67 circuit near its resonant frequency for maximum efficiency in terms of sound pressure level. Output driver circuit 65 preferably includes a switch or means to select a desired setting for the buzzer sound pressure level. Associated driver circuitry is also included in driver circuit 65 as is well known in the art.

Temperature sensor conditioning circuits 80 and 83 are preferably identical signal conditioning circuits connected to base temperature probe 25 and air temperature probe 15, respectively. Conditioning circuits 80 and 83 also preferably include circuitry to determine probe failure in either "open" or "shorted" failure modes and forward signals to microcomputer 30. Thus, two inputs, a temperature and error inputs, are provided from each conditioning circuit 80 and 83 into the A/D inputs of microcomputer 30. Associated capacitors are provided in conditioning circuits 80 and 83 to provide for EMI and other noise filtering functions, as are well known in the art.

Output driver circuits 85 and 87 are preferably two identical output circuits for driving base heating element 20 and quartz heat bulbs 10, respectively. Driver circuits 85 and 87 preferably include optoisolated triac driver integrated circuits such as MOC3041. Appropriate protection circuity is provided to prevent false turn-on as is well known in the art. Control signals are provided from microcomputer 30 into driver circuits 85 and 87 to turn on heating elements 20 and 10 at appropriate times, as will be discussed more fully below.

The present invention preferably also includes circuitry to provide for additional heating means in the oven should they be desired to provide even greater flexibility and control as the presently described embodiment. A fan fail circuit may also be provided to detect failure of the of off-board cooling fan and thus warn an operator or shut down the system to prevent further damage.

Overall Process Performed

The overall operation of the process of the present invention in a preferred embodiment is depicted in the flow diagram of FIG. 3, and will now be described in some detail below. The process is executed by microcomputer 30 (shown in FIG. 1) and resides in the internal non-volatile memory of microcomputer 30 (not specifically shown in FIG. 1).

Figure 3:
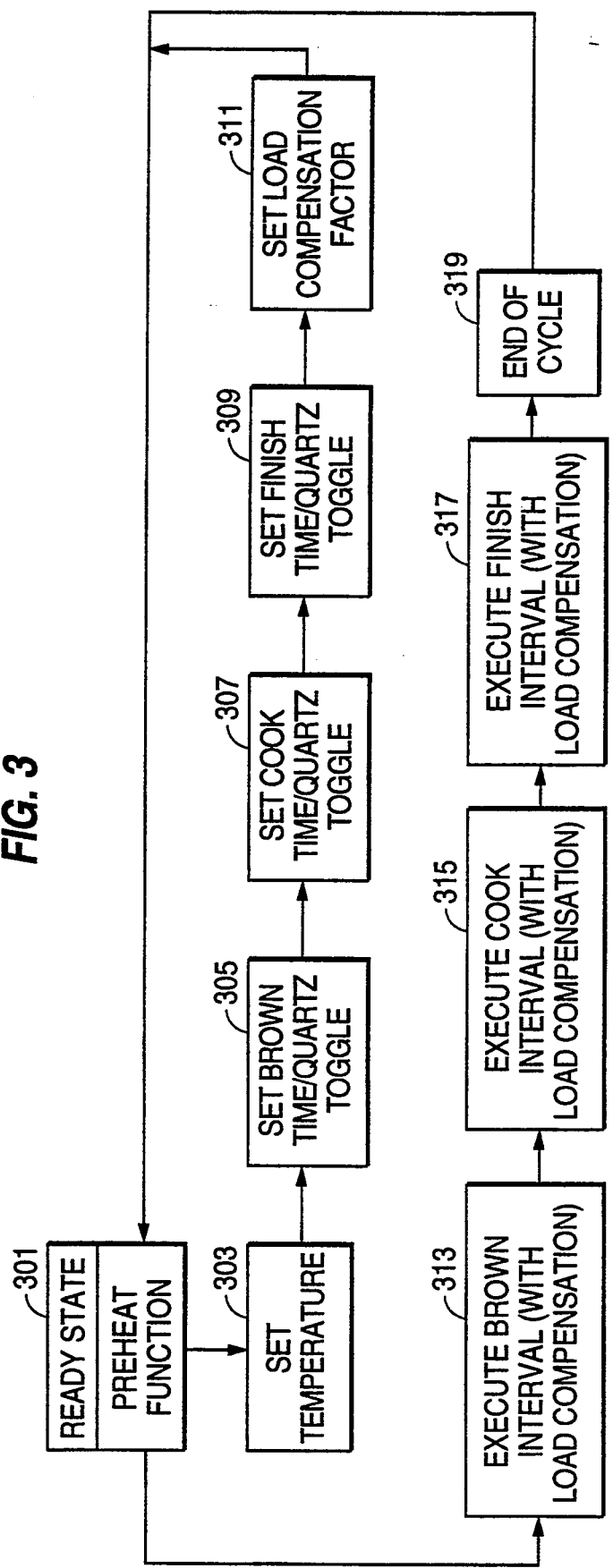
FIG. 3 shows a flowchart for the overall functioning of the present invention.

Referring to FIG. 3, the three aspects of the present invention are shown interacting with one another. Specifically, step 301, the ready state/preheat function is performed when the oven's operation is initially started, and is repeated as needed thereafter. This step generally consists, in part, of heating the base of the oven to a predetermined temperature by means of activating the base heating element (element 20 in FIG. 1) and thereafter heating the air in the oven's internal cavity to a predetermined temperature by means of the quartz heat bulbs (element 10 in FIG. 1). The automatic preheat steps are described in more detail in copending application entitled "PREHEATING METHOD AND APPARATUS FOR USE IN A FOOD OVEN" by the same inventors and incorporated herein by reference.

When a user of the present invention wishes to set the various parameters corresponding to the operation of the oven, he/she may press a "SET" switch (such as the "SET" switch of element 63 of FIG. 1). In a preferred embodiment, the present invention will thereafter prompt the user to enter the various parameters, examples of which are illustrated in steps 303-311. For example, in a preferred embodiment, the user may utilize the increment/decrement switches of element 63 (INC and DEC) to modify the parameters in steps 303-311. In another embodiment, the user may directly enter the desired parameters on a device such as a numeric keypad, etc.

Step 303 comprises setting the base setpoint temperature for the oven. This value represents the desired temperature of the base plate of the oven. This value is used during the preheat function (step 301) as well as the actual oven usage intervals as described below with respect to steps 313-317.

Steps 305-309 comprise setting the time for the "brown", "cook" and "finish" intervals as well as switching the quartz lamps to either be on or off during each interval according to one embodiment of the present invention. The selected values are stored in memory. In a preferred embodiment, the operator may select a time duration between 0-15 minutes for each cooking interval, where the total cooking time is the sum of the selected cooking interval times. The time of each interval may be displayed on display 75. After the time for a particular interval is selected, the operator sets heating element 10 to be on or off during that interval. A toggle switch may be provided to set heating element 10. The operator then selects the time for the next interval. However, the order in which the values are selected is not critical. For example, each of the interval times may be selected first, and then the heating element 10 may be set for the individual intervals. In addition, the structure used to select the interval times and to selectably set heating element 10 is not critical. One of skill in the art may recognize a variety of structures to accomplish these functions, including a numeric keyboard with an on/off button, individual buttons, dials, etc. In a preferred embodiment. LED status indicators prompt the operator to select a particular parameter.

The selected times and settings are stored within the control system of the present invention, and are thereafter utilized in steps 313–317 to determine the appropriate timing characteristics of the various cooking intervals and the operation of heating element 10. In a preferred embodiment, the first heating element 10 is set on during the "brown" interval, off during the "cook" interval, and on during the "finish" interval. These intervals and cooking steps are described in greater detail in copending application entitled "METHOD AND APPARATUS FOR OPERATING A FOOD OVEN" by the same inventors, incorporated herein by reference.

Steps 311 involves setting a load compensation factor. The load compensation factor is utilized by the load compensation aspect of the present invention to account for the type of load being cooked within the oven and the particular temperature within the oven. The load compensation factor is used by steps 313–315 in a preferred embodiment to compensate the timing characteristics of the various operating intervals, and it will be described in further detail below with respect to FIGS. 2a and 2b. After the load compensation factor has been set, execution transfers back to the ready state/preheat function until the user requests another operation.

Steps 313–317 involve executing the "brown", "cook" and "finish" intervals according to a preferred embodiment of the present invention. These steps are executed after the associated characteristics have been set in steps 303–311, and when the user selects, in a preferred embodiment, the "start" function by pressing the "Start/Stop" key ("START/STOP" switch of element 63 of FIG. 1). Steps 313–317 utilize the corresponding temperature, times, load compensation factor, and heating element 10 switch settings selected in steps 303–311. Specifically, the temperature set in step 303 is maintained throughout these steps, the times for the various intervals are kept in conjunction with the load compensation factor, and the quartz lamp operational status is maintained for each of the three intervals in a preferred embodiment. If the time of a particular interval is set to 0, that interval is skipped. Throughout the cooking cycle, status indicators 77 indicate the interval which is being executed.

Finally, step 319 corresponds to the end-of-cycle operation performed after the "brown", "cook" and "finish" intervals are completed. After this step has been reached, execution is transferred back to the ready state/preheat function of step 301. A more detailed description of a preferred embodiment of the present invention follows.

Load Compensation Operation

As described above, a purpose of the present invention is to ensure a uniformly processed product, regardless of product and environment variations. For example, the temperature of the food product entering the oven may vary depending on whether it is frozen or fresh, and how long it has been unrefrigerated before cooking. The stored heat of the oven will vary depending on the usage of the oven prior to cooking the product. For examples, in the case of a pizza oven, the stored heat of the oven will be greater after several pizzas have been cooked, than it is during cooking the first pizza of the day. A system is needed which compensates for variations in the temperature of the product (load) and the environment—a load compensation.

Some experimental results indicate that one of the best ways to perform load compensation in an oven having two heating elements is to vary the on-time of the quartz lamp. The on-time of quartz lamp 10 preferably changes as the function of the actual air temperature in the oven and the base temperature set point measured by air temperature probe 15 and base temperature probe 25 respectively, as well as the load compensation factor. Thus, as the air temperature increases, the quartz on-time is shortened. In a preferred embodiment, the quartz on-time is never lengthened, although such an implementation is certainly possible.

Various degrees of load compensation may be programmed into EEPROM 55. Preferably, the load compensation may be set from 0 to 10. Zero is equivalent to no load compensation with 10 equivalent of (100%) load compensation. Load compensation may be programmed by the user from input switches 63 and stored in EEPROM 55. Additionally, the exterior front panel of the oven would preferably include a method of inserting a menu indicating which food item, and corresponding previously programmed load compensation, may be selected by a user.

Basically, implementation of the load compensation performs the following steps to determine the on-time of quartz lamp 10.

(1) Read the load compensation factor from a non-volatile memory.
(2) Set a variable "LcLim" to the difference between the base temperature set point (in A/D bits) and a constant.
(3) If "LcLim" is less than zero, then set LcLim to zero: otherwise, set LcLim to the base temperature set point multiplied by a constant minus another constant.
(4) During each pass through the main loop:
  (i) Set "TempErr" to the difference between the oven cavity air temperature and LcLim.
  (ii) Set a variable "N1" to TempErr multiplied by a load compensation value contained in a table indexed by the load compensation factor previously read from the non-volatile memory.
  (iii) Determine if variable N1 is less than a constant and if so assign it a value.
  (iv) Determine if TempErr is less than a constant. If so, assign LcReset a constant value. If not, assign LcReset the value of a constant minus N1 times a constant.
  (v) When a cooking interval begins, if the quartz lamps have been programmed to be turned on during the interval, then:
    (i) Set "QClock" to the total number of seconds programmed for the cooking interval.
    (ii) Set "LcCount" to the value of LcReset, and set "LcSec" to a constant, preferably 10.
    (iii) During each timer interrupt, decrement LcCount, and when LcCount reaches zero, decrement LcSec.
    (iv) Decrement QClock" when LcSet reaches zero.
    (v) Turn quartz lamps off when QClock reaches zero.

Figure 2A:
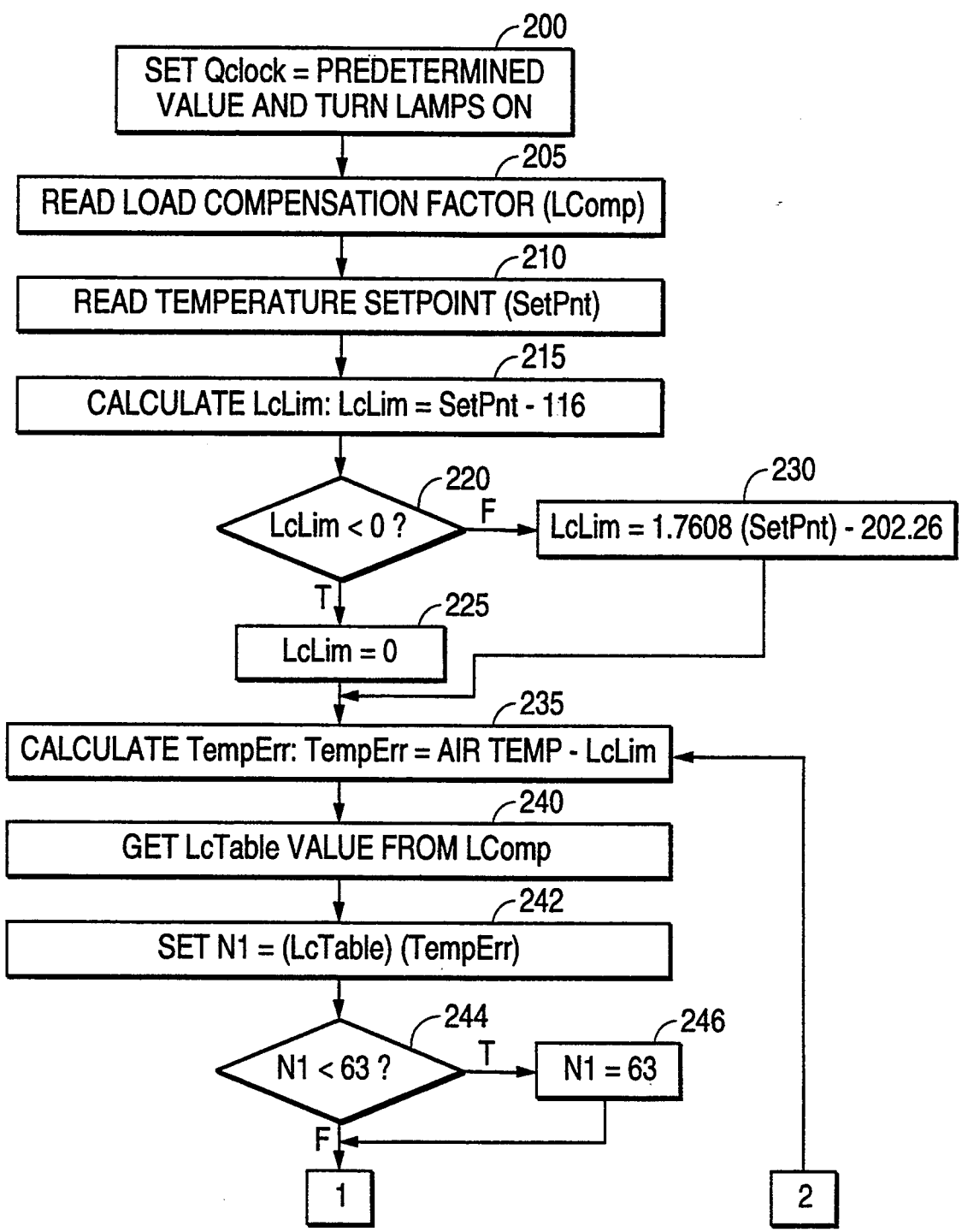
FIGS. 2a and 2b show flow charts detailing the operation of the present invention.
Figure 2B:
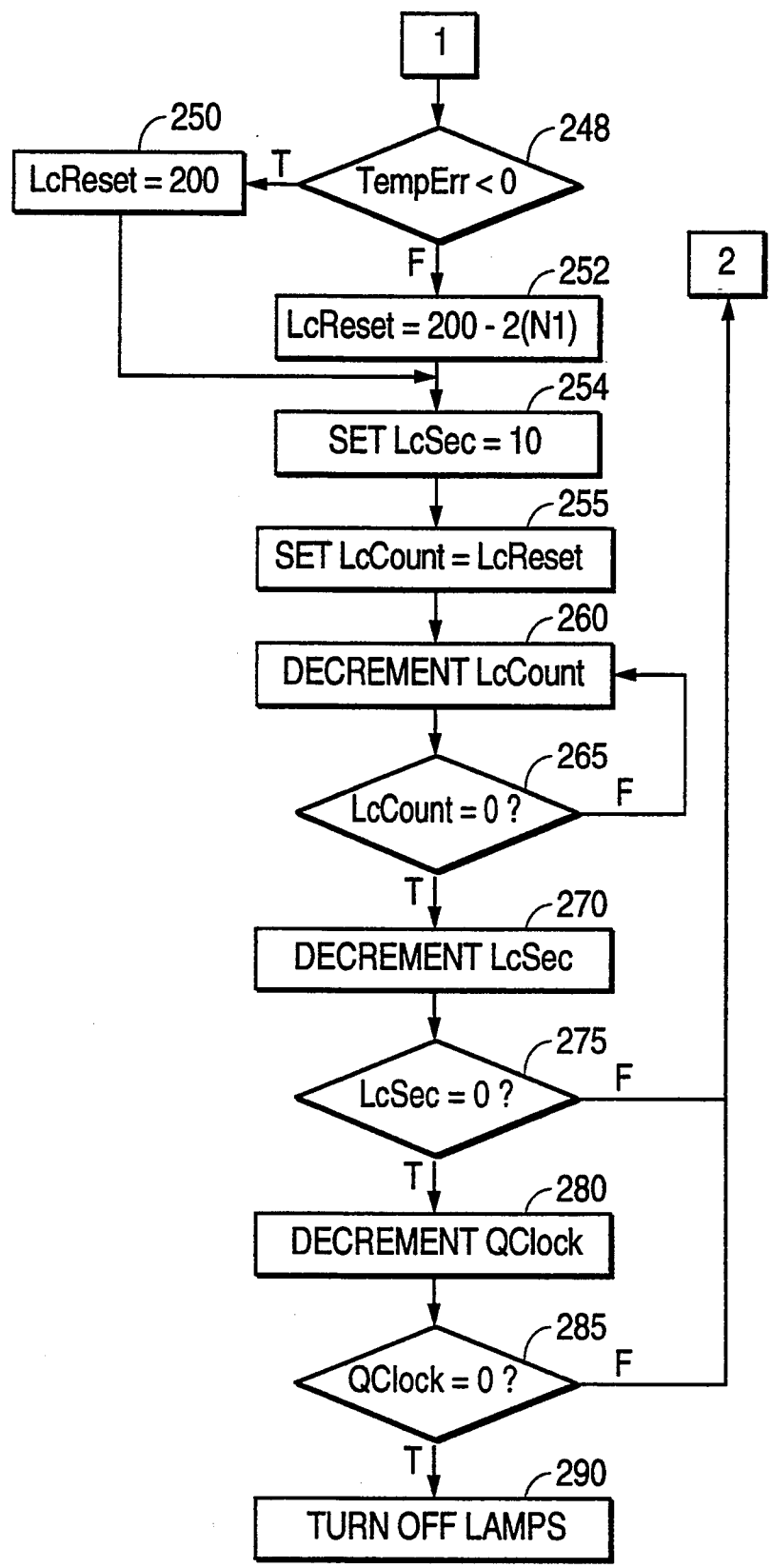

Referring to FIGS. 2a and 2b, the basic operation described above for the load compensation factor is depicted. Each time an interval starts during the cooking process (i.e. brown, cook or finish), the control program checks to see if the quartz lamps have been programmed on for that interval. If the quartz lamps had been programmed on, then a variable QClock is calculated as:

$$QClock = 60 \ (minutes) + seconds$$

QClock obviously is then the total time in seconds. QClock is a clock that is run in parallel with the cooking time display 75 which is displayed on the front surface of the oven. QClock does not keeps "real" time but rather a compensated time depending upon the current air temperature of the oven and the load compensation factor. Thus, the higher the air temperature the more quickly QClock will decrement. Referring to FIG. 2a, QClock is set to a predetermined value for the particular cooking interval when the quartz lamps have been programmed on in block 200.

A load compensation factor depending on a particular food item is read from EEPROM 55 and stored in the RAM memory of microcomputer 30 as variable LcComp in block 205. The SetPnt temperature is stored as A/D bits and not in degrees. A particular predetermined temperature set point "SetPnt" is read from non-volatile memory in block 210. SetPnt represents a base temperature which is desired for a particular product to be cooked. Thus, a sandwich at room temperature would presumably have a lower predetermined SetPnt temperature while a frozen pizza would have a higher SetPnt value.

In block 215, the value LcLim is calculate by the formula:

$$LcLim = SetPnt - 116$$

If LcLim is less than 0 (block 220), then LcLim is set to 0 (block 225). Otherwise, if LcLim is greater than 0, then LcLim is calculated in block 230 as:

$$LcLim = 1.7608(SetPnt) - 202.26$$

Next, a temperature error value TempErr is calculate in block 235 by the formula:

$$TempErr = AirTemp - LeLim$$

where AirTemp is the current actual air temperature in the oven cavity as detected by air temperature probe 15. Temperature from air probe 15 is read in and filtered through conditioning circuit 83 and into A/D channel of microcomputer 30. Additionally, block 230 determines whether an error exists in air temperature probe 15. TempErr is an error value representing the difference between the current actual air temperature and the desired air temperature for the current base temperature SetPnt.

Using a lookup table stored in non-volatile memory, a value LcTable is selected in block 240 from the previously read load compensation factor LcComp. The following table shows the entry for valid values of LcComp:

| LcComp | LcTable Entry |
|--------|---------------|
| 0 | 0.000 |
| 1 | 0.102 |
| 2 | 0.200 |
| 3 | 0.298 |
| 4 | 0.400 |
| 5 | 0.502 |
| 6 | 0.600 |
| 7 | 0.702 |
| 8 | 0.800 |
| 9 | 0.902 |
| 10 | 1.000 |

Note that these table entries step from 0 to 100% in steps of approximately 10%.

In block 242, a variable N1 is set by the formula:

$$N1 = (LcTable)(TempErr)$$

If N1 is less than 63 (block 244) then N1 is set to 63 in block 246. This is necessary to establish the maximum amount of load compensation that can occur. Note that the constant 63 could be another number but is preferably set to this value. Referring now to FIG. 2b, if TempErr is less than 0 (block 248), then LcReset is set to 200 (block 250). Otherwise, LcReset is calculated by the following formula in block 252:

$$LcReset = 200 - 2(N1)$$

Figure 4:
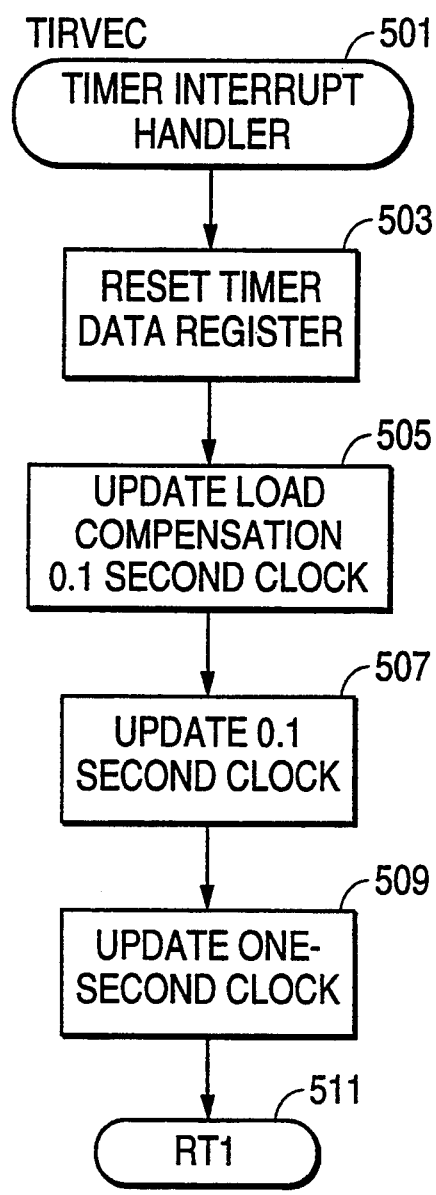
FIG. 4 shows a flowchart of the timer interrupt handler steps performed by the present invention.

Timer interrupts occur 2,000 times a second and are described in FIG. 4. Referring briefly to FIG. 4, block 501 indicates the beginning of the timer interrupt handler subroutine. In block 503, the timer data register is reset. In block 505, load compensation 0.1 second clock is updated. In block 507, the 0.1 second clock is updated. In block 509, the 1 second clock is updated. And in block 511, the subroutine interrupt instruction is returned.

FIG. 2b shows that in block 254, LcSec is set to 10. In block 255, LcCount is set to equal LcReset.

In block 260 of FIG. 2b, the clock LcCount is decremented. In block 265, if LcCount is equal to 0, then the clock LcSec is decremented in block 270. Otherwise, LcCount is again decremented in block 260. If clock LcSec is equal to 0 (block 275), then QClock is decremented in block 280. Otherwise, the process returns to block 235 and again goes through the above described steps.

If QClock equals 0 in block 285, then quartz lamps 10 are turned off in block 290. Otherwise, the process again returns to block 235.

From the above we see that the counter LcReset determines the length of a compensated second.

To summarize, the clocks involved in load compensation are:

LcCount: is initialized to LcReset. LcCount is decremented at each timer interrupt, and times are approximately 0.1 seconds. Actual time is 0.1 "compensated" second.

LcSec: is initialized to 10. LcSec is decremented (in UpdQClock routine) each time LcCount reaches 0, and its time approximately equals 1 second. Actual time is 1 "compensated" second.

QClock: is initialized to the total seconds in a predetermined and programmed interval (brown, cook or finish). QClock is decremented (in UpdQClock routine), each time LcSec equals 0. Its actual time is the total "compensated" interval time.

While the present invention has been disclosed with respect to a preferred embodiment and modifications thereto, further modifications will be apparent to those of ordinary skill in the art within the scope of the claims that follow. For example, although the formulas used to determine load compensation are linear as a function of air temperature and the SetPnt, this is not mandatory. A polynomial or logarithmic function would provide a better approximation to the effects of cooking time and temperature, but would complicate the process.

The compensation time could be made a function of the actual base temperature as well as the base SetPnt and other factors, including the air temperature as described above. The compensation could be designed to extend the quartz lamp on-time as well as the above described decrease in quartz on-time. Additionally, the quartz on-time compensation could be designed to work in conjunction with total cooking time compensation rather than on an interval basis.

The load compensation factor need not be the same for all intervals, and more intervals than three could be added. Greater details on operation of the steps in the above implementation are described in great detail in the source code described in Appendix A of parent Ser. No. 07/746,910, herein incorporated in full. These details shown in this Appendix are primarily concerned with underflow, overflow, fractional representations of binary numbers and handling of signs of binary numbers. Refer specifically to the routines "READPROD, AIRSTAT and UPDQCLOCK in the Appendix. All these techniques are obvious and well known to one skilled in the art and may include other techniques known to those skilled in the art. Consequently, it is not intended that the invention be limited by the disclosure, but instead that its scope be determined entirely by reference to the claims which follow.

In an alternative embodiment, a load compensation technique is disclosed for use specifically with a rotisserie type cooking oven. An example of a rotisserie cooking device and a control therefor is disclosed in U.S. Pat. Nos. 4,968,515 and 5,044,262 issued to Burkett et al. and assigned to the assignee of the present invention. These patents are hereby incorporated herein by reference.

According to one aspect of this embodiment, the actual cooking time of a rotisserie is adjusted based on a load compensation factor and a difference between an actual air temperature and set point temperature. According to this technique, each displayed second of the cooking time is lengthened or shortened based on the difference in temperature between the actual sensed temperature and the set point temperature.

According to this embodiment, at the start of each new displayed cook timer "second", the timer interrupt code accesses a look-up table to obtain a multiplier associated with the current load compensation setting. It then multiplies the temperature difference (Actual air temperature—Setpoint temperature, preferably in degrees F.) by this multiplier to arrive at a time adjustment value.

If the actual air temperature is ABOVE the current setpoint temperature, the adjustment value is SUBTRACTED from a nominal value of "100" (i.e., 100/100ths of a second) and reloaded into the 100 Hz countdown component of the cook timer. This results in a "cook timer second" which is < 100/100ths of a real second, and therefore results in a cook timer that counts down FASTER than real time.

If the actual air temperature is BELOW the current setpoint temperature, the adjustment value is ADDED to a nominal value of "100" and reloaded into the 100 Hz countdown component of the cook timer. This results in a "cook timer second" which is > 100/100ths of a real second, and therefore results in a cook timer that counts down MORE SLOWLY than real time.

EXAMPLE

If the load compensation setting for the current product is "5", the setpoint temperature is 350 F., and the air temperature in the rotisserie is currently 320 F., then the temperature difference (350–320) is 30 Deg F. BELOW setpoint temperature.

Since the load compensation setting is 5, then from the look-up table, the multiplier associated with this setting is found, which in one embodiment is 0.5.

From this information, the load compensation adjustment can be obtained as follows:

$$LCAdjust = 30 * 0.5 = 15$$

Since the temperature is BELOW setpoint, the adjustment (15) is ADDED to 100 to EXTEND the length of a "second" of cook time. Therefore, the 100'ths byte of the cook timer (CookTmr. 100s) is loaded with 115/100ths 100+LCAdjust seconds.

Therefore, the next "second" (i.e. displayed second) of cook time is 15/100ths seconds longer than a "real" second.

According to one embodiment, the temperature difference may be limited to a maximum, (e.g., +/−255 degrees F.) so that the "TmpDif" (temperature difference) can be handled as an 8-bit integer. When it is MORE than 255 degrees F. above or below setpoint, the Load Compensation adjustment will be the same as if it were exactly 255 degrees F. above or below setpoint, though it would rarely be this far from setpoint while cooking.

Also, the final 100's reload value may be limited to the range "LC100Min." to "LC100Max.", as a means of restricting the timing to reasonable rates. For example, these constants can be set to limit the minimum 100's reload value to 50/100ths seconds, and the maximum reload value to 200/100s. This effectively limits the load compensation to at most halving or doubling the cooking time.

Preferably, the actual cook timer components—Hours, Minutes, seconds, and 100ths of seconds—actually count down to −1 rather than to 0, so they are reloaded with values 1 less than the item they count. For example, 100ths of seconds is normally reloaded with "99" to count one full second (99 . . . −1 = 100/100ths of a second), and reloading minutes with 59 will result in a 60 minute countdown (59.−1). This adjustment to the 100ths component of the cook timer is made by simply decrementing the calculated reload value just before saving it into the 100ths byte of the cook timer. Preferably, all of the load compensation calculations are made based on a nominal value of "100".

According to one embodiment, the look-up table, referred to as the "LCPercentTbl," is represented as 8-bit fractional values, and is indexed by the load compensation setting (0 . . . 10). In a preferred embodiment, the table contains the following values.

| 8 bit fractional value (/256) | Load Compensation Setting |
| --- | --- |
| 0 | 0 = 0% |
| 26 | 1 = 10% (10% * 256 = 25.6) |
| 51 | 2 = 20% (20% * 256 = 51.2) |
| 77 | 3 = 30% (30% * 256 = 76.8) |
| 102 | 4 = 40% (40% * 256 = 102.4) |
| 128 | 5 = 50% (50% * 256 = 128.0) |
| 154 | 6 = 60% (60% * 256 = 153.6) |
| 179 | 7 = 70% (70% * 256 = 179.2) |
| 205 | 8 = 80% (80% * 256 = 204.8) |
| 230 | 9 = 90% (90% * 256 = 230.4) |
| 255 | 10 = 100% (255/256 — 99.6%) |

The values in this table may be changed based on actual cook testing and analysis. Also, the progression of values need not be linear.

The following code exerpts illustrate a preferred way of carrying out this embodiment.

```
;----------------------------------------------------------------
;G e t L C A d j 1 0 0 s (Get Load Compensation Adjusted 100's) Subroutine
;This routine returns the 100's reload value for the state variables pointed to by [X].
This ;value may be more or less than 100/100ths of a second, depending on the degree
of ;load compensation selected and the current difference between actual air
temperature ;and the product's setpoint temperature.
;
;Input:     [X] -- points to state variables
;           _LoadComp -- load compensation setting
;           _SetptTmpF$ -- product temperature setpoint (Sear/Cook/Hold)
;           AirTmpF$ -- current air temperature
;
;Output:    [A] -- 100's seconds for the next "cook second" (LC100Min..LC100Max)
;               Since timer counts down to -1, "99" is exactly one second, and
;               224 is two and 1/4 seconds, etc.
;
;Routines Called: None
;Exit State:               [A] -- adjusted 100's (99 = 1 full second)
;                          [X] -- unchanged (points to state variables)
;                          [B],CCR -- indeterminate
;
;----------------------------------------------------------------

GetLCAdj100s:

;On entry here, [X] points to the state variables record and a copy of the state vars
;PSHX
;+ + [save a copy of the state vars pointer]
;First, calculate how far below setpoint we are.
;
;If Setpt > Actual, (Setpt-Actual > 0), we are lower than we want to be
;  and therefore must stretch out time by adding a little to each second.
;
;If Setpt < Actual, (i.e. Setpt-Actual < 0), we are higher than we want to be
;  and therefore must speed up time by reducing each second a little bit. This may be
;  implemented as follows.

LDD       _SetptTmpF$,X   ;Calculate the difference between setpoint
                                    ;temperature and actual temperature (+ = = >
                                    ; add time, -= = > subtract time)
          SUBD;     AirTmpF$
          PSHA                      ;+(Save top byte of difference -- pos or neg)
          BPL       GotAbsDif       ;If positive difference, we're ready . . .
```

```
            COMA                    ;Else convert negative number to positive
            COMB                    ;(two's complement = bit comp, then add 1)
            ADDD    #0001           ;)two's complement = bit comp, then add 1)
```

;Now have 16-bit absolute value of Setpt-AirTmp in [D]. Clip this to a
;maximum working value of 255 so we can work with single byte values.

```
GotAbsDif:
            TSTA                    ;If top byte is = 0 ...
            BEQ     LE255           ; then [B] is already less than or equal to 255
            LDAB    #255            ; else clip difference in [B] to 255
LE255:
```

;At this point, we have 8-bit absolute value of tmp. diff. in [B] (0..255).
;
;Multiply "temperature difference" by the percent appropriate for the
;current LoadComp setting for this product.

```
            TBA                     ;First, transfer dif to [A] so we can use [B]
            LDAB    LoadComp,X      ;Get the load compensation setting
            LDX     #LCPercentsTbl  ;Get base address of the Load Comp/Pcnts
                                    ;table
            ABX                     ;[X] points to "fractional" byte LDAB    0,X             ;Get the fraction (i.e. 50% = 128, etc.)
                                    ;Difference byte is still in [A]
            MUL                     ;Multiply by fraction -- 16 bit answer ADCA    #0              ; is 8-bit integer and 8-bit fraction
                                    ;("ADCA #0" rounds integer byte up, if nec.)

TAB                     ;Transfer result (0..255) into [B]
            PULA                    ;-[Get original sign -- positive or negative]
            TSTA                    ;Do we need to INCREASE or DECREASE
                                    ;time?
            BPL     LongerTime      ;(LCPcnt * TmpDif) is still in [B]
```

;Need to reduce cook time seconds

```
ShorterTime:
            LDAA    #100            ;Start with a "full" second (i.e. 100/100's)
            SBA                     ;SUBTRACT the calc'd adj value ([B]) from
                                    ;100
            BCS     ClipToMin       ;If [B] was > [A], clip to min
            CMPA    #LC100Min.      ;Else are we below minimum value?
            BHS     LCAdj100sDone   ;If >= min, we're all set ClipToMin:

LDAA    #LC100Min       ;Else clip to minimum value...
            BRA     LCAdj100sDone
```

;Need to extend cook time seconds

LongerTime:
```
            LDAA    #100                ;Start with a "full" second (i.e. 100/100's)
            ABA                         ;ADD the calc'd adj value ([B]) to 100
            BCS     ClipToMax           ;If [B] + [A] > 255, clip to max value CMPA    #LC100Max.          ;Else compare result to max:
            BLS     LCAdj100sDone       ;If < = max, we're all set ClipToMax:
            LDAA    #LC100Max.          ;Else clip to maximum allowed value
;opt        BRA     LCAdj100sDone LCAdj100sDone:                          ;Need to return adjusted 100's value in [A] . . .
                                        ;Subtract 1 -- we count from 99 down to -1 to
            DECA                        ;get one full second, etc PULX                        ;--(Restore the original state vars ptr)
            RTS                         ;(On exit, [X] still points to state vars rec)
```

;----------------------------------------------------------------------
;D o S t a t e 1 0 0 H z T m r s (Do State 100Hz Timers) Subroutine
;
;This routine takes care of the 100 Hz timers and clocks that are directly associated with
;the state variables record.
;
;Cooking and Holding timers receive special attention: A Load Compensation
;calculation is used to decide how long a "second" of cook time should be, based on
;whether we are over or under the current product setpoint and what level of load
;compensation is used.
;
;One second of cook time when no Load Compensation is in effect or when we are
;currently right on the setpoint temperature, is exactly 100 1/100's (0..99). When Load
;Compensation is in effect, however, we might tally another second of cook time either
;sooner or later than the normal 100 1/100's. For example, if we are above setpoint, we
;may tally the next second of cook time after only 95/100's actual time (because the
;product is cooking a little faster than it would at the setpt temperature). If below
;setpoint, one second may be 110/100's, for example.
;
;
;Input:      _CookTmr
;
;Output:     _CookTmr
;
;Routines Called:
;Exit State:            [A], [B], [X], CCR - indeterminate
;
;----------------------------------------------------------------------
DoState100HzTmrs:

;On entry here, [X] points to the state variables record.

AlmEoc:
```
            LDD     _AlmEoc100s$,X      ;Get the Alm/Eoc duration timer
```

```
        SUBD    #0001                   ;Subtract 1/100 second
        BMI     AlmEocDone              ;If not decremented to -1 ...
        STD     _AlmEoc100s$,X          ; ... then save the new value
AlmEocDone:
```

;Decrement the Cook timer 100's of a second.
;
;If 100's hit negative, just finished another "second". Need to reload 100's while
;decrementing SS's (rippling to MM's, if necessary).
;
;If Load Compensation is in effect, we may load 100's with more or less than 100/100's,
;to compensate for temperature being more or less than setpoint. (Note that reloading
;with "99" = 1 full second, since we count from 99 downto -1 ... If no load comp is in
;effect, simply reload with unadjusted 99.

```
DecCook:
        LDAA    _CookTmr+_Sta,X         ;Test the top bit of the status byte;
        BPL     DecCookDone             ;If b7 = 0, timer is not Running --
                                        ;ignore...

LDAA    _CookTmr+_100,X         ;Else decrement 1/100's:
        SSUBA   #1                      ;(*Note: _100 value is UNSIGNED
                                        ;255..0)
        STAA    _CookTmr+_100,X
        BCC     DecCookDone             ;If _100's decremented from 0 --> 255,
                                        ;need to reload 100's, decrement SS ...

JSR     GetLCAdj100s            ;Get new 100's value based on AirTmp
                                        ; SetptTmp, and LoadComp setting STAA    _LCAdj100,X             ;(Save for later reference, as when
                                        ;blinking colon leds at half "second" rate)

STAA    _CookTmr+_100,X         ;Save new 100's reload value ...
        DEC     _CookTmr+_SS,X          ; ... and decrement seconds
        BPL     DecCookDone             ;If SS still >= 0, all done here LDAA    #59                     ;Else if seconds hits -1 ==> reload at
                                        ;59 sec.
        STAA    _CookTmr+_SS,X
        DEC     _CookTmr+MM,X           ; ... and decrement minutes
        BPL     DecCookDone             ;If MM still >= 0, all done here LDAA    #59                     ;Else if seconds hits -1 ==> reload at
                                        ;59 min.
        STAA    _CookTmr+_MM,X
        DEC     _CookTmr+_HH,X          ;... and decrement hours
        BPL     DecCookDone
                                        ;If Hours hits -1 ...
        LDAA    #TmrTimeOut.            ;... we've hit the end -- signal timed
                                        ;out!
        STAA    _CookTmr+_Sta,X DecCookDone:
```

RTS

The "DoState100HzTmrs" subroutine is preferably called every 1/100th second by the (hardware) TimerISR (Interrupt Service Routine).

The "AlmEoc100s" timer, handled at the start of DoState100HzTmrs, is separate from load compensation.

The values in the LCPercentsTbl are preferably implemented as 8-bit fractions (i.e. "X" in the table is implicitly the fraction "X"/256), but these multiplier constants do not need to be limited to fractional values. The multipliers could be 8-bit integer/8-bit fractional numbers, for example, to allow much more aggressive compensation.

In the preferred embodiment the cook time is sped up or slowed down by adding or subtracting "K * abs (SetptTmpF - AirTmpF)" to a nominal value of "100" when reloading the 1/100s component of the CookTmr countdown timer.

CookTmr.100s: = 100 + K*(SetptTmpF-AirTmpF)

(where "K" is the multiplier for the current LoadComp setting)

An alternate correction calculation would make the adjustment directly proportional to the percent temperature difference rather than just the temperature difference itself. In this embodiment, an air temperature that was 15% too low, for example, could result in a cook timer "second" that was 15% longer, etc. For example, the time could be adjusted as follows:

$$CookTmr.100s := 100 + K*((SetptTmpF - AirTmpF)/SetptTmpF)$$

Figure 5:
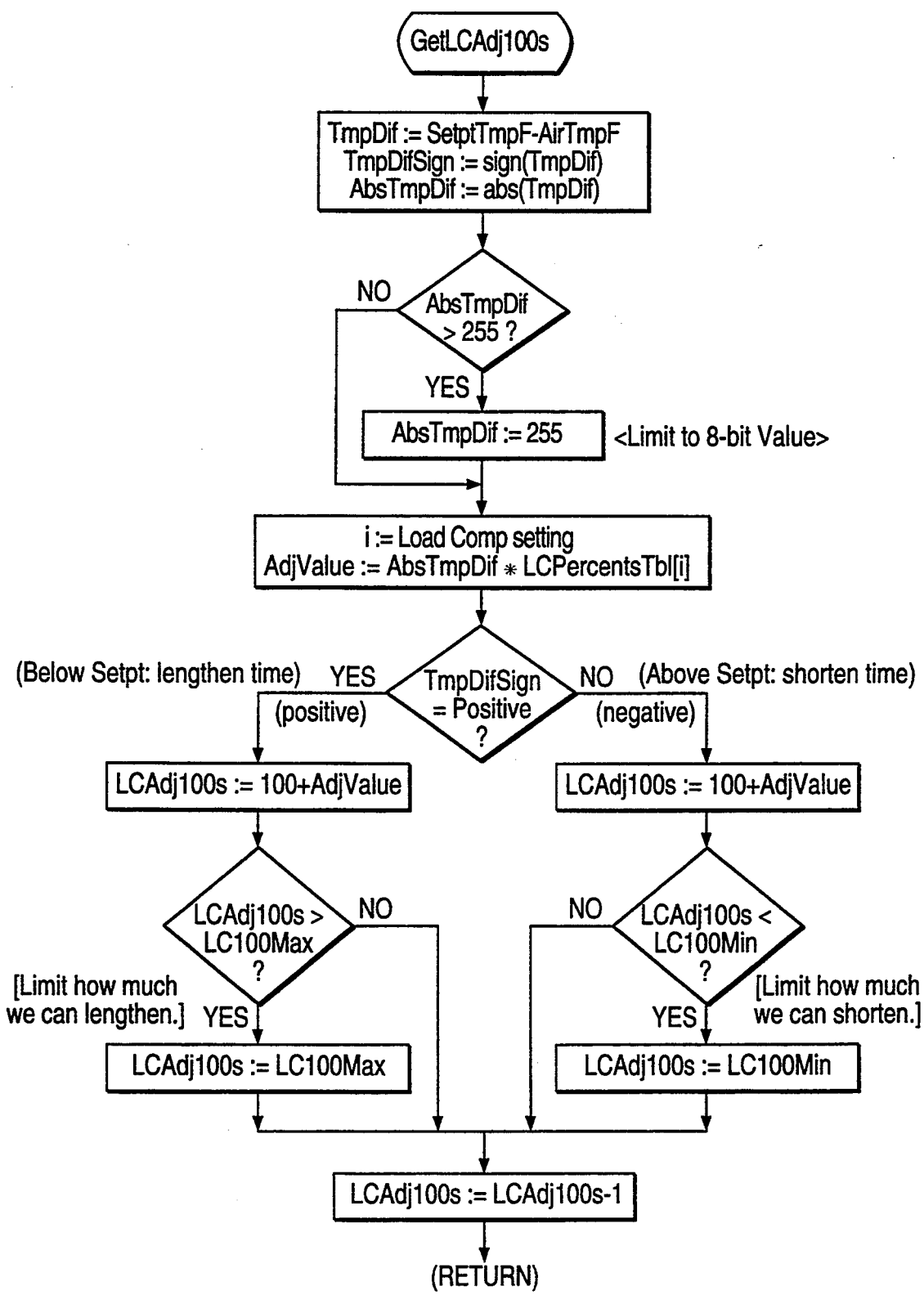
FIG. 5 is a flowchart for the "Dostate 100HzTMrs" subroutine.
Figure 6:
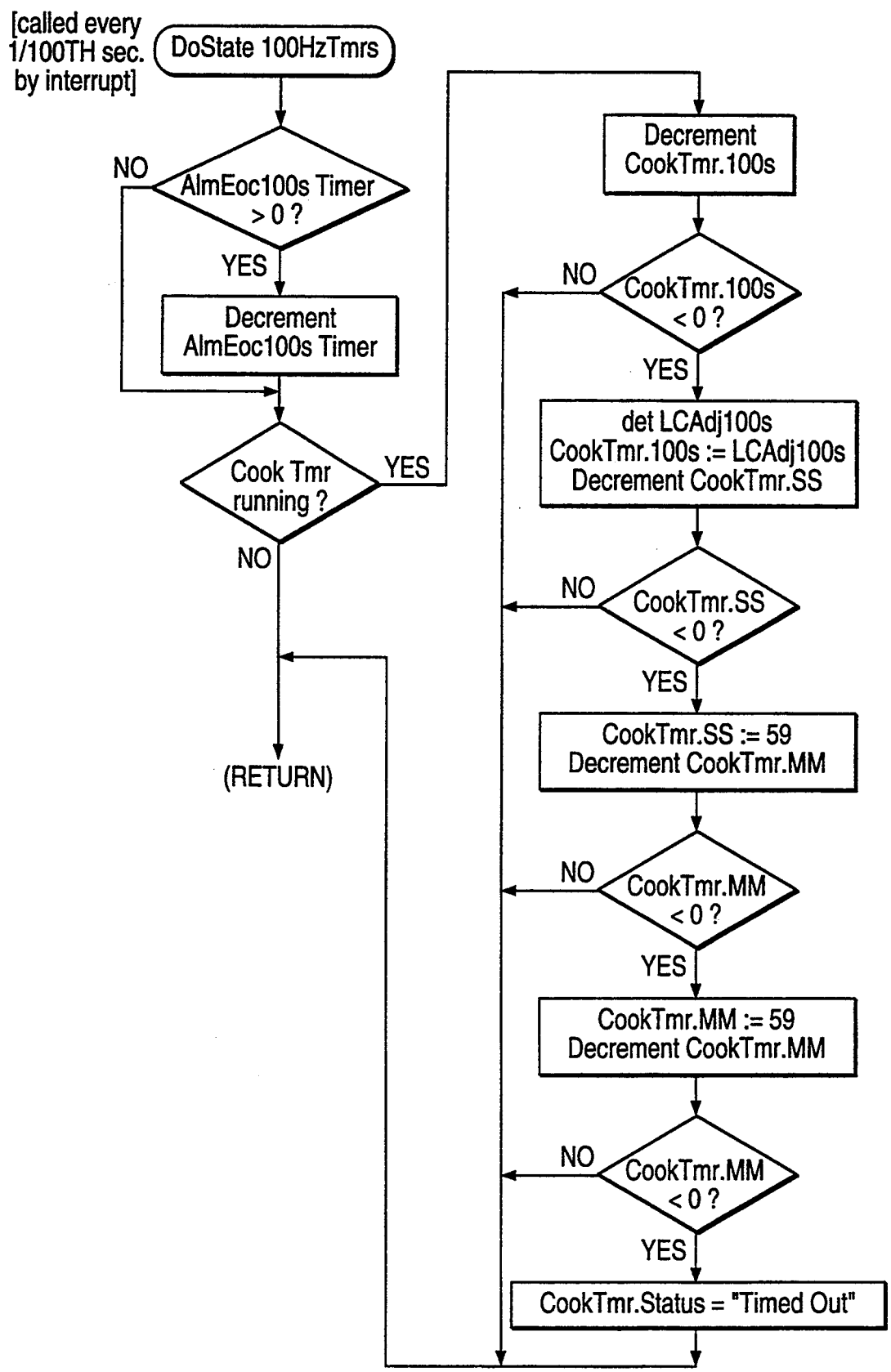
FIG. 6 is a flowchart for the "GetLCadj100s" subroutine.
Figure 5:
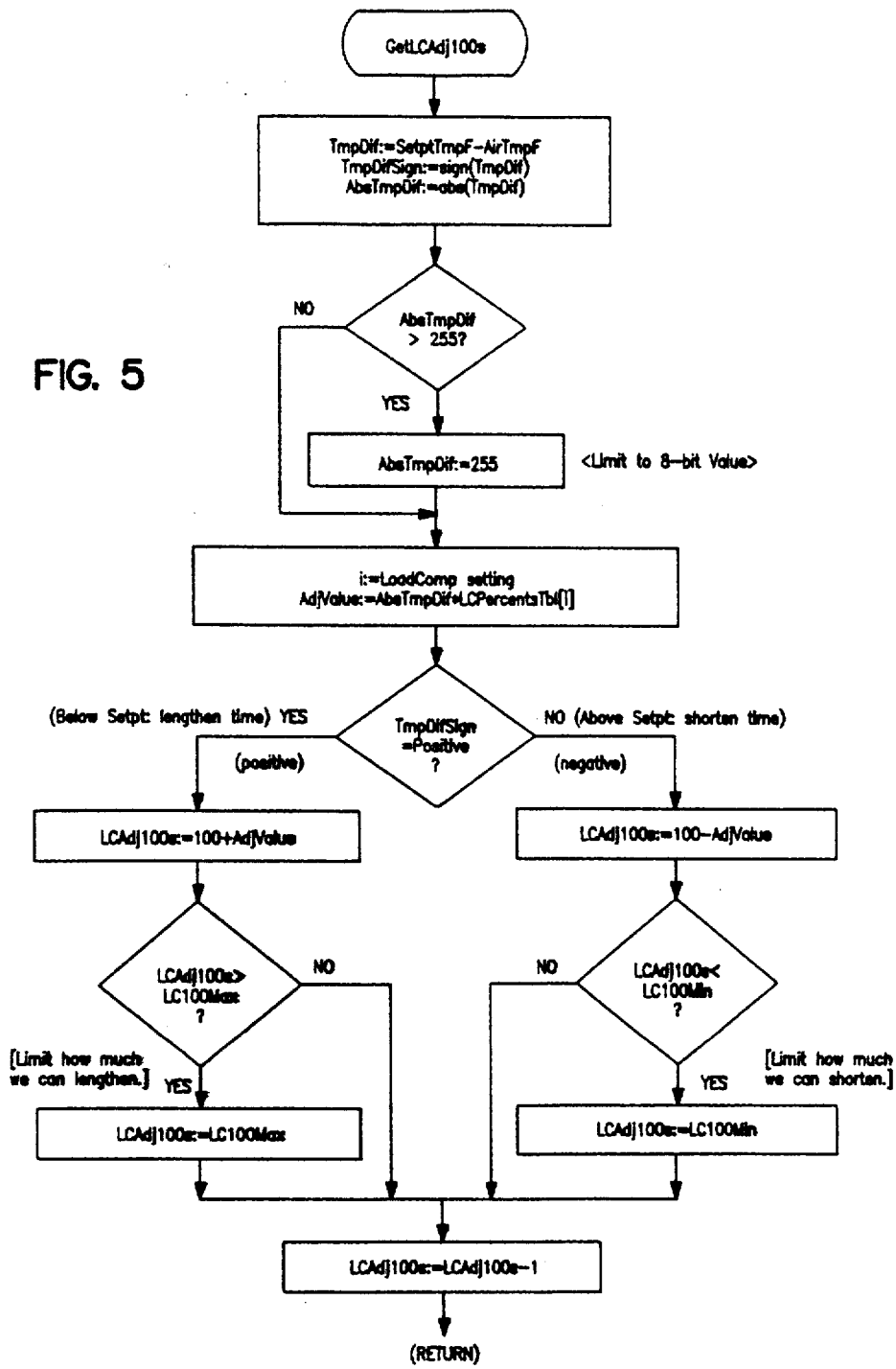
Figure 6:
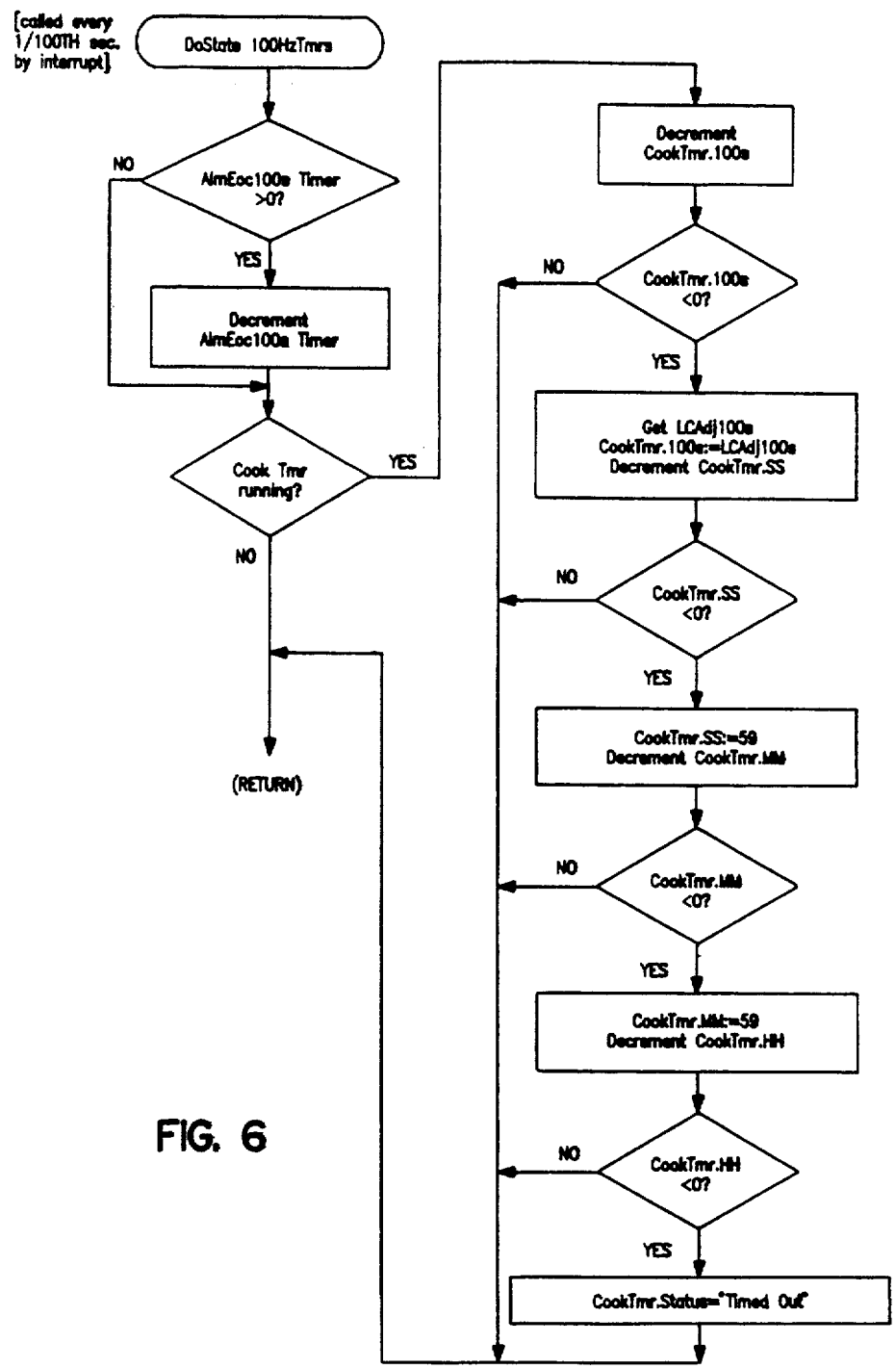

A flow chart illustrating the steps in the "Dostate100HzTMrs" subroutine is depicted in FIG. 5. A flow chart depicting the "GetLCadj100s" subroutine is depicted in FIG. 6.

The foregoing is a description of the preferred embodiments of the present invention. Various alternatives and modifications will be readily apparent to one of ordinary skill in the art. The invention is only limited by the claims appended hereto.

We claim:

1. A rotisserie oven for cooking food comprising
   heating means for heating food located in the rotisserie oven;
   air temperature sensing means for sensing the temperature of air in said rotisserie oven; and,
   control means, responsive to the air temperature sensing means for selectively controlling said heating means, wherein said control means is programmable with a predetermined cook time, a predetermined cook temperature and a load compensation factor;
   wherein said control means further comprises means for determining an actual cook time derived from said predetermined cook time, the difference between the sensed temperature of the air in said rotisserie oven and the predetermined cook temperature, and the load compensation factor said heating means heating said food for said actual cook time.

2. The oven of claim 1 wherein said actual cook time is determined by adding a load compensation adjustment to said predetermined cook time if said sensed temperature of air in said rotisserie oven is below said set point temperature and subtracting a load compensation adjustment from said predetermined cook time if said sensed temperature is above said set point temperature.

3. The oven of claim 2 wherein said load compensation adjustment is determined by multiplying a load compensation factor by the difference between said predetermined cook temperature and the sensed air temperature.

4. The oven of claim 1 wherein said load compensation adjustment is determined by determining the percent difference between said sensed air temperature and the predetermined cook time.

5. The oven of claim 4 wherein said percent difference is multiplied by a load compensation factor to obtain a load compensation adjustment and wherein said load compensation adjustment is added to or subtracted from said predetermined cook time.

* * * * *

UNITED STATES PATENT AND TRADEMARK OFFICE
CERTIFICATE OF CORRECTION

PATENT NO. : 5,352,865
DATED : October 4, 1994
INVENTOR(S) : Douglas A. Burkett et al It is certified that error appears in the above-identified patent and that said Letters Patent is hereby corrected as shown below:

Delete Drawings Sheets 5 and 6, and substitute therefor the Drawings Sheets, consisting of Figs. 5 and 6, as shown on the attached pages.

Signed and Sealed this

Ninth Day of December, 1997

Attest:

BRUCE LEHMAN

Attesting Officer

Commissioner of Patents and Trademarks